(12) United States Patent
Zheng

(10) Patent No.: US 12,281,940 B2
(45) Date of Patent: Apr. 22, 2025

(54) MINIATURE SPECTRUM MEASURING DEVICE AND THIN FILM FILTER

(71) Applicant: LITE-ON SINGAPORE PTE. LTD., Singapore (SG)

(72) Inventor: Rui-Tao Zheng, Singapore (SG)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 220 days.

(21) Appl. No.: 17/693,404

(22) Filed: Mar. 13, 2022

(65) Prior Publication Data

US 2023/0092614 A1  Mar. 23, 2023

(30) Foreign Application Priority Data

Sep. 23, 2021  (CN) .......................... 202111115181.9

(51) Int. Cl.
| | |
|---|---|
| *G01J 3/12* | (2006.01) |
| *G01J 3/02* | (2006.01) |
| *G01J 3/10* | (2006.01) |
| *G01J 3/36* | (2006.01) |
| *G01J 3/45* | (2006.01) |
| *G02B 5/28* | (2006.01) |

(52) U.S. Cl.
CPC ............... *G01J 3/12* (2013.01); *G01J 3/0256* (2013.01); *G01J 3/10* (2013.01); *G01J 3/36* (2013.01); *G01J 3/45* (2013.01); *G02B 5/285* (2013.01); *G01J 2003/102* (2013.01); *G01J 2003/1226* (2013.01)

(58) Field of Classification Search
CPC .... G01J 3/12; G01J 3/0256; G01J 3/10; G01J 3/36; G01J 3/45; G01J 2003/102; G01J 2003/1226; G02B 5/285
See application file for complete search history.

(56) References Cited

U.S. PATENT DOCUMENTS

| | | | | |
|---|---|---|---|---|
| 6,678,093 | B1* | 1/2004 | Scobey | G02B 5/284 |
| | | | | 359/578 |
| 2005/0013000 | A1* | 1/2005 | Uehara | G02F 1/0305 |
| | | | | 359/586 |
| 2005/0018301 | A1* | 1/2005 | Uehara | G02F 1/21 |
| | | | | 359/586 |
| 2005/0184248 | A1* | 8/2005 | Kanazawa | G21K 1/06 |
| | | | | 250/372 |
| 2006/0007547 | A1* | 1/2006 | Kamikawa | G02B 5/288 |
| | | | | 359/589 |
| 2011/0216315 | A1* | 9/2011 | Uematsu | G01J 3/0262 |
| | | | | 356/326 |
| 2014/0022544 | A1* | 1/2014 | Kurokawa | G01J 3/12 |
| | | | | 356/326 |
| 2017/0053402 | A1* | 2/2017 | Migukin | G01R 33/561 |
| 2018/0259697 | A1* | 9/2018 | Hung | G02B 5/285 |

FOREIGN PATENT DOCUMENTS

EP        1602902 A1 * 12/2005  .............. G01J 3/26

* cited by examiner

*Primary Examiner* — Dominic J Bologna
(74) *Attorney, Agent, or Firm* — Li & Cai Intellectual Property Office

(57) ABSTRACT

A filter and a miniature spectrum measuring device are provided. The filter includes a plurality of film structures. Each of the film structures includes an H-type structural film, an L-type structural film, and a cavity film disposed between the H-type structural film and the L-type structural film.

10 Claims, 8 Drawing Sheets

MINIATURE SPECTRUM MEASURING DEVICE AND THIN FILM FILTER

CROSS-REFERENCE TO RELATED PATENT APPLICATION

This application claims the benefit of priority to Patent Application No. 202111115181.9, filed on Sep. 23, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a thin film filter with a multilayer structure and a miniature spectrum measuring device using thereof, and more particularly to a thin film filter with a multilayer structure and a miniature spectrum measuring device that utilizes a transmitted or reflected light of an object without spectral separation processing and performs spectral modulation processing to reconstruct a spectrum of an object to be measured.

BACKGROUND OF THE DISCLOSURE

Conventional spectrum measuring devices mostly perform spectral separation processing on a light to be measured, and often require complex grating spectroscopic devices. As a result, the spectrum measuring device has a high cost, a complex structure, and high installation accuracy requirements, and is generally only suitable for a laboratory environment. In other words, the spectrum measuring device is not easy to carry around.

While a Fourier spectrometer does not need to perform the spectral separation processing, a sophisticated optical interference device is required. As such, the Fourier spectrometer is also only suitable for the laboratory environment.

In recent years, compact spectrometers based on the thin film interference filter technology have gradually been developed, in which a Single band-pass filter design is often adopted. Accordingly, a large number of filters and detectors are used for spectrum measurement, thereby increasing the cost and the manufacturing difficulty.

Therefore, how to provide a low-cost miniature spectrum measuring device has become one of the important issues to be solved in the industry.

SUMMARY OF THE DISCLOSURE

In response to the above-referenced technical inadequacies, the present disclosure provides a miniature spectrum measuring device and a thin film filter.

In one aspect, the miniature spectrum measuring device having a film structure includes a controller, a light source provider, and an optical receiver group. The light source provider includes at least one light source. The light source provider is electrically connected to the controller, and the light source provider provides a plurality of lights with different spectra. The optical receiver group includes a plurality of thin film filters and a plurality of signal converters. The plurality of signal converters are electrically connected to the controller, and each of the plurality of thin film filters having a film structure is disposed on each of the signal converters. The light source provider transmits the light to an object. The optical receiver obtains a plurality of optical signals with different spectra based on the thin film filters that modulate the light transmitted or reflected from the object. The optical receiver group provides the plurality of optical signals to the controller.

In another aspect, the present disclosure provides a thin film filter. The thin film filter includes at least two sets of mirror-function multilayer structure film, each of which includes at least an H-type structural film and an L-type structural film, and a cavity film disposed between two mirror-function multilayer structures.

Therefore, the miniature spectrum measuring device provided by the present disclosure can use a specific light source provider and a limited number of optical receivers to receive reflected or transmitted light of the object to be measured. The received signal is modulated by the film structure disposed in front of the optical receivers to reconstruct the spectrum of the object. The miniature spectrum measuring device of the present disclosure can be used to detect the object to be measured or a specific light source, and can further improve detection speed and accuracy.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
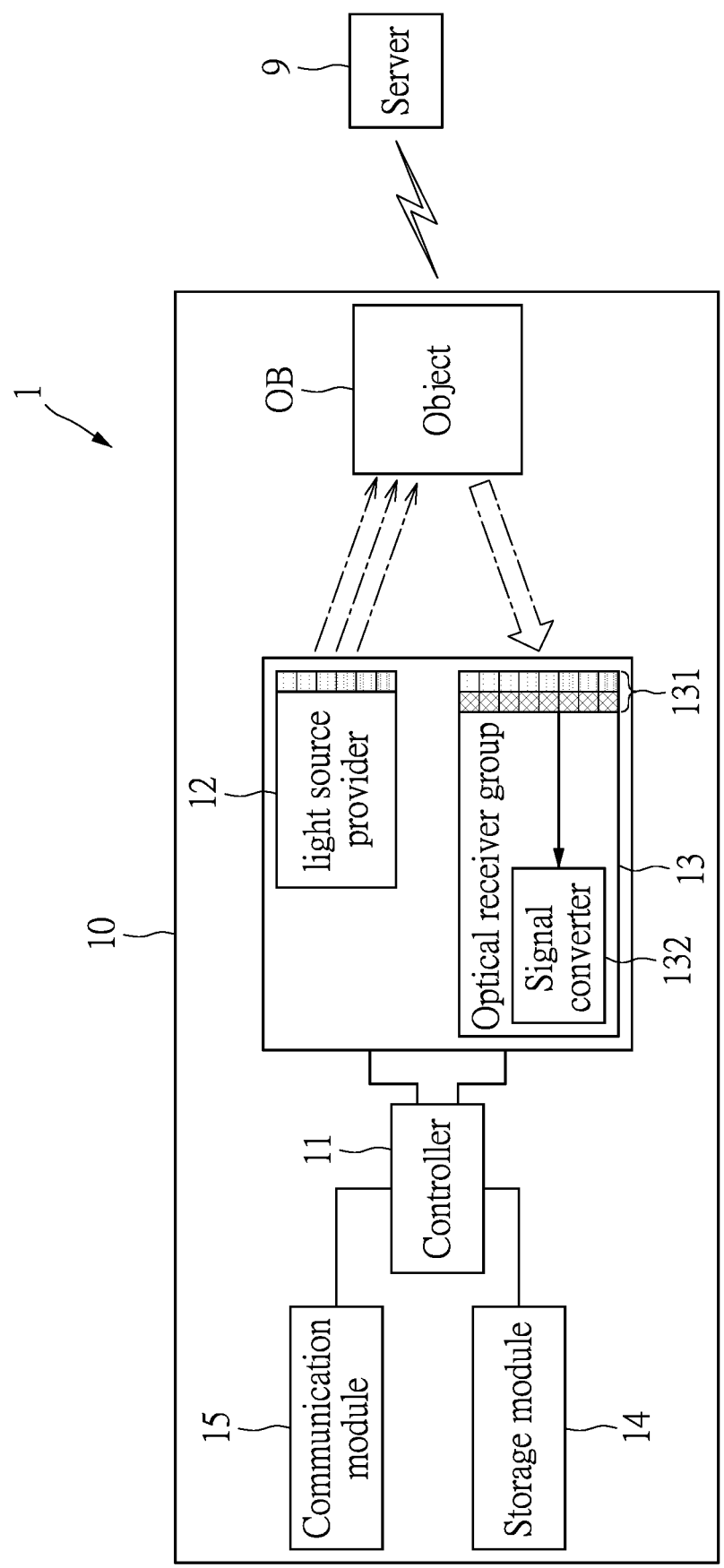
FIG. 1 is a schematic diagram of a miniature spectrum measuring device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
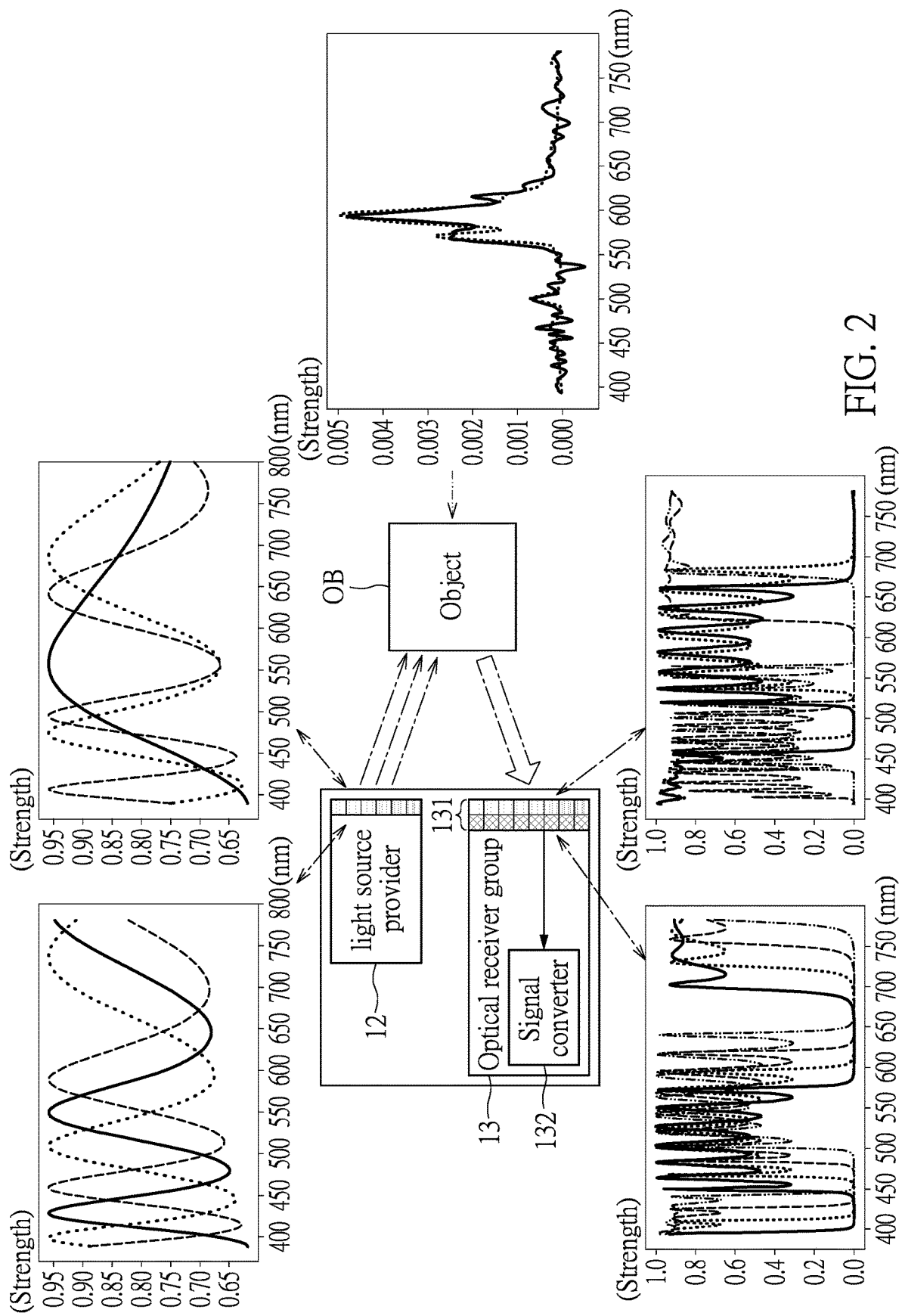
FIG. 2 is another schematic diagram of the miniature spectrum measuring device according to the first embodiment of the present disclosure.
Figure 3:
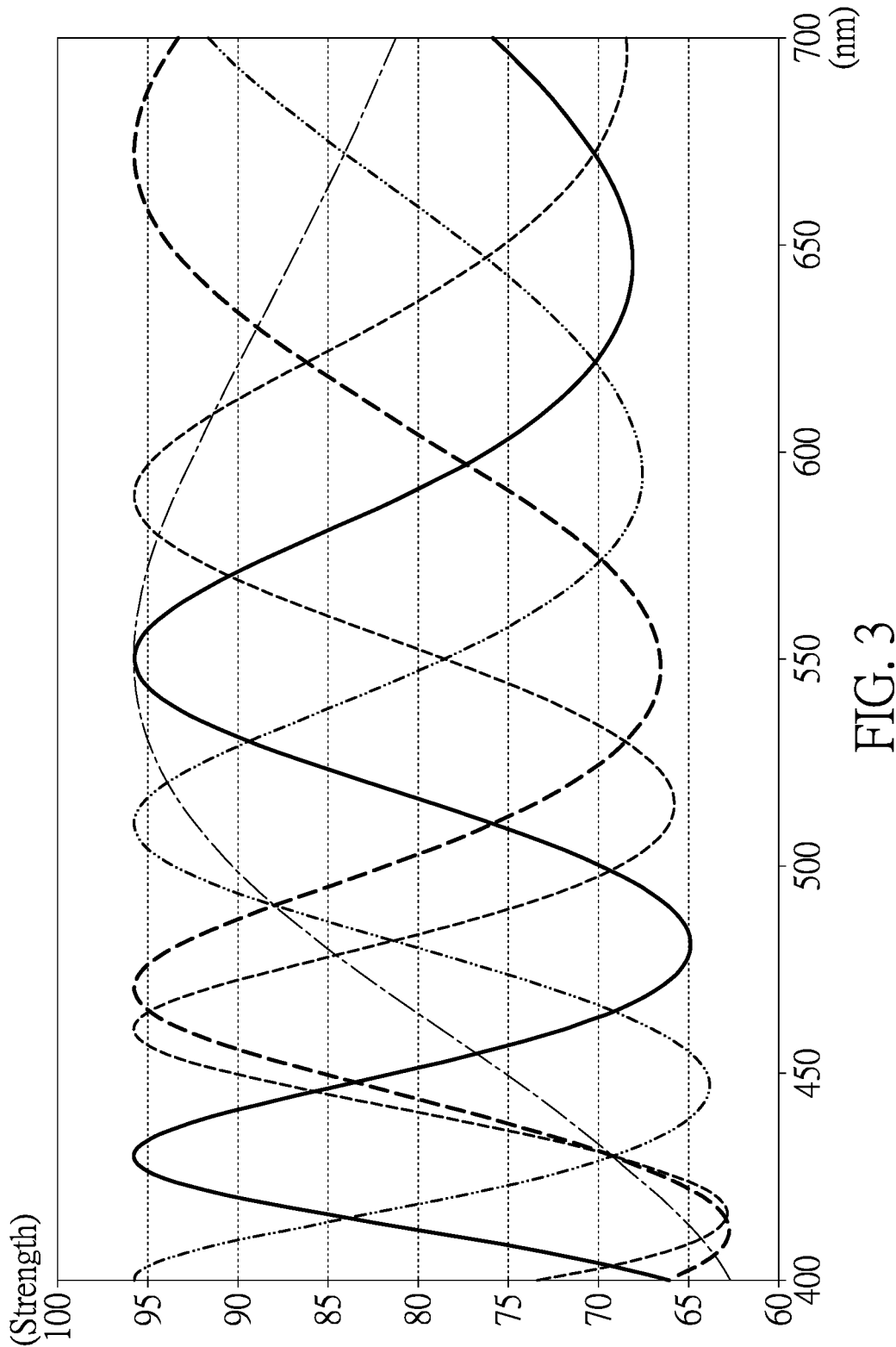
FIG. 3 is a spectrum diagram showing light sources with different wavelengths provided by a light source provider of FIG. 1.
Figure 4:
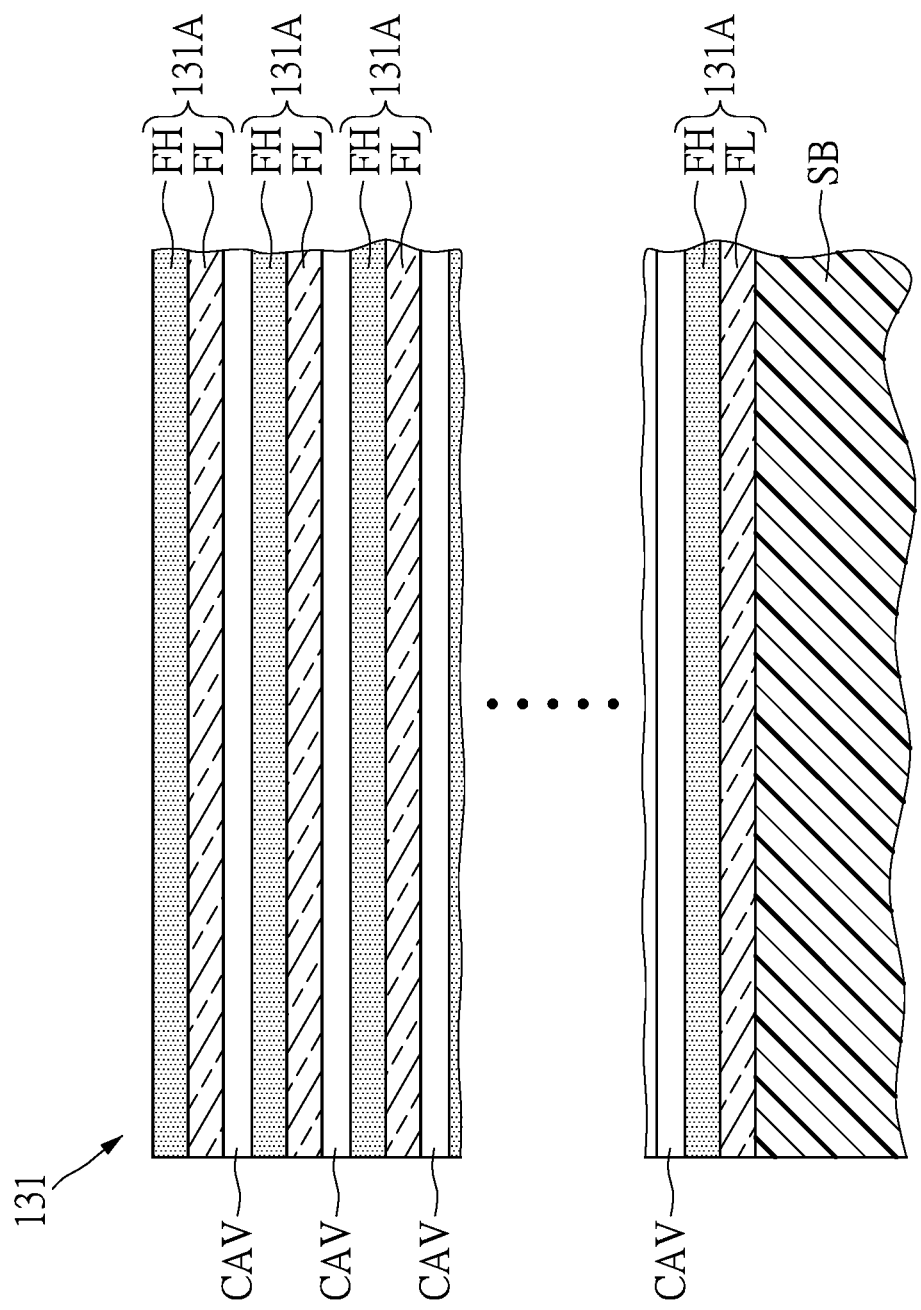
FIG. 4 is a schematic diagram of a plurality of film structures of a filter according to the present disclosure.

Reference is made to FIG. 1, FIG. 2, FIG. 3 and FIG. 4. FIG. 1 is a schematic diagram of a miniature spectrum measuring device according to a first embodiment of the present disclosure, FIG. 2 is another schematic diagram of a miniature spectrum measuring device according to a first embodiment of the present disclosure, FIG. 3 is a spectrum diagram that a light source provider of FIG. 1 provides light with different wavelengths, and FIG. 4 is a schematic diagram of a filter with a film structure of the present disclosure.

A miniature spectrum measuring device 1 includes a controller 11, a light source provider 12, an optical receiver group 13, a storage module 14, a communication module 15, and a housing 10.

The controller 11 is electrically connected to the light source provider 12, the optical receiver group 13, the storage module 14, and the communication module 15. In this embodiment, the controller 11, the light source provider 12, the optical receiver group 13, the storage module 14, and the communication module 15 are disposed in the housing 10.

The light source provider 12 includes a plurality of light sources with different spectrum. In this embodiment, the plurality of light sources of the light source provider 12 can be a plurality of light sources with different spectrum, or can be similar light sources that have been modulated by different filtering films. For example, the light source provider 12 includes six light sources that are obtained by performing a spectrum modulation with six different filtering films respectively disposed at the front of a same single wide-band light source.

As shown in FIG. 3, in this embodiment, the six light sources are obtained by modulating a same white light source through the six different filtering films. In this embodiment, the filtering film is formed by an $SiO_2$ film material. However, an $SiO_2$ thickness of the filtering film disposed in front of each light source is different. Therefore, the six light sources with the corresponding filtering films can provide lights with six types of spectra.

The optical receiver group 13 includes a set of filters with a film structure 131 and a plurality of signal converters 132. The signal converters 132 are respectively disposed at a bottom side of the filters with a film structure 131. A spectrum of the filter with a film structure 131 includes multi-peak transmission spectrum signals. The plurality of the signal converters 132 of the optical receiver group 13 are electrically connected to the controller 11.

Figure 5:
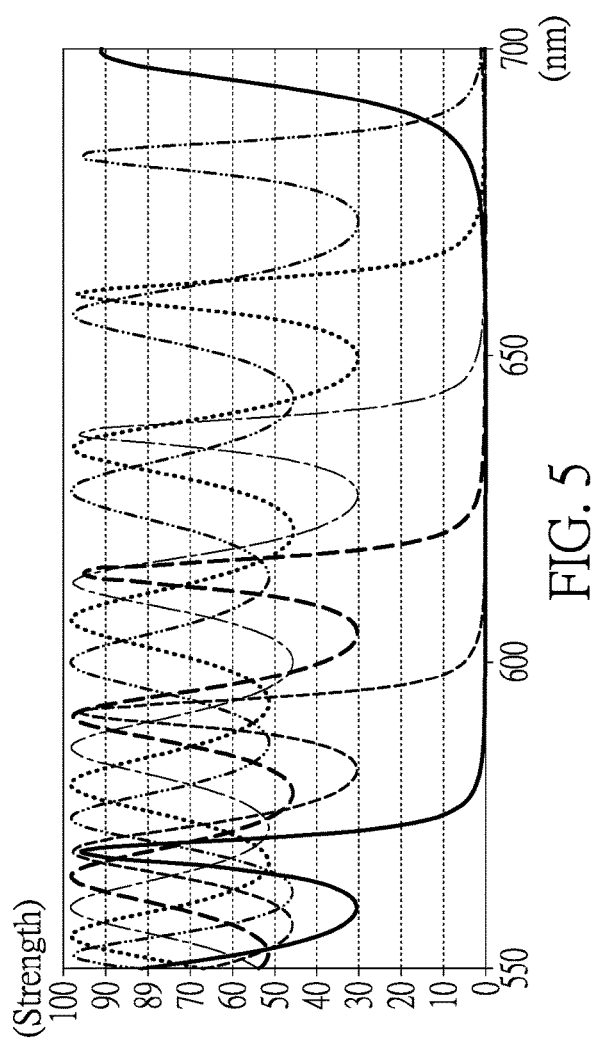
FIG. 5 and FIG. 6 are transmission spectrum diagrams of the filter that includes the plurality of film structures and eight filters according to the first embodiment of the present disclosure.
Figure 6:
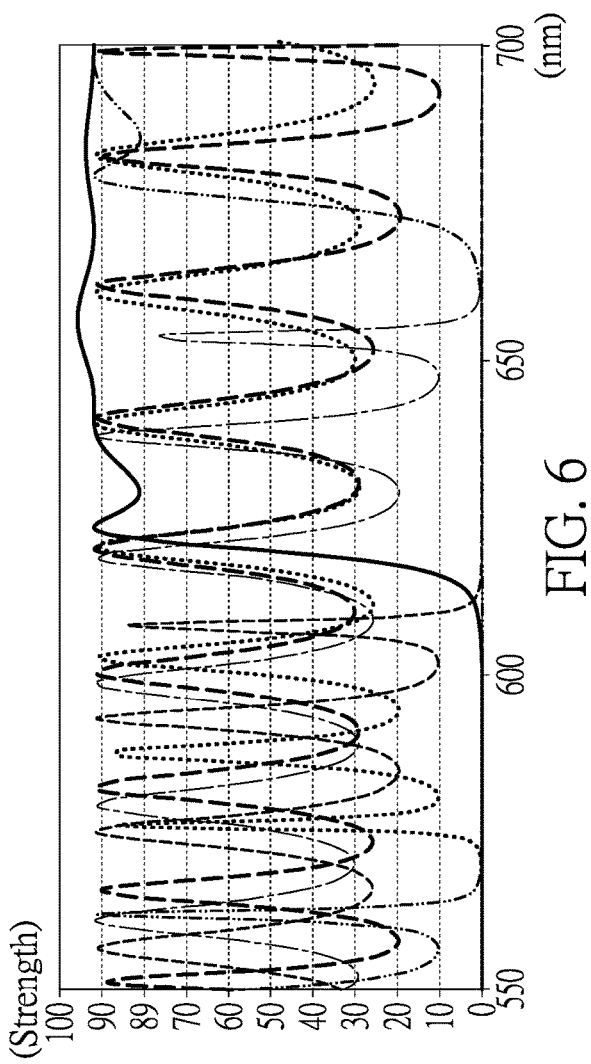

The light received by each of the signal converters 132 in the optical receiver group 13 is spectrally modulated by the filters 131 having different film structures. In this embodiment, each of the signal converters 132 in the optical receiver group 13 has a filter with a film structure 131 of a specific spectral response (transmission spectrums thereof are shown in FIG. 5 and FIG. 6). In this embodiment, the optical receiver group 13 includes eight signal converters. In other words, the eight signal converters with eight multi-layer films 131A are configured to modulate optical signals from an object OB and receive the optical signals. Therefore, a reconstruction spectrum of the object OB between 400 mm and 800 mm in FIG. 2 is obtained through a reconstruction algorithm. In this embodiment, the six light sources are turned on separately. That is, only one light source is turned on each time. Due to the different spectra of the eight multilayer films 131A, the optical receiver group 13 can receive eight different optical signals. When multiple light sources are sequentially turned on, the optical receiver group 13 can receive forty-eight optical signals, and the forty-eight optical signals are used to reconstruct the spectral response of the object OB to be measured through the reconstruction algorithm.

In other words, as shown in FIG. 2, the spectral response of the object OB is modulated by an ambient light source to generate a spectrum. In this embodiment, the miniature spectrum measuring device 1 provides light of a predetermined wavelength or a predetermined spectrum to the object OB. After the object OB absorbs, transmits, or reflects the light from the light source provider 12, the light from the object OB is received by the optical receiver group 13 of the miniature spectrum measuring device 1. The filter with a film structure 131 of the optical receiver group 13 is configured to perform spectral modulation, so as to obtain a plurality of optical signals with different spectral information. Then, the optical signals are transmitted to the controller 11. Furthermore, the controller 11 can store a plurality of spectral frequency signals in the storage module 14. The controller 11 then transmits the plurality of spectral frequency signals to a server 9 through the communication module 15.

The controller 11 of the miniature spectrum measuring device 1 can transmit the plurality of optical signals to the server 9. The server 9 or the controller 11 is capable of analyzing the optical signals based on a spectrum reconstruction algorithm to reconstruct an initial spectral response of the object OB. In this embodiment, the spectrum reconstruction algorithm includes a least square algorithm, a Tikhonov regularization algorithm, or a deep learning algorithm. A user can use any other machine learning algorithm based on actual requirements, and the present disclosure is not limited thereto.

Referring to FIG. 4, the filter of film structure 131 includes a plurality of multilayer films 131A with a reflection function and a plurality of cavity films CAV. The multilayer films 131A and the cavity films CAV are arranged in a laminated manner.

The multilayer film 131A includes an H-type structural film FH and an L-type structural film FL for formation of a lens. In this embodiment, the H-type structural film FH includes $TiO_2$. The L-type structural film FL includes $SiO_2$. The cavity film CAV is formed by one layer film including $TiO_2$. The cavity film CAV is disposed between two sets of the multilayer films 131A.

In addition, the plurality of multilayer films 131A and the plurality of cavity films CAV are arranged in a laminated manner to form the filter with a film structure 131. The filter of film structure 131 is disposed on a substrate SB. In this embodiment, thicknesses of the cavity films CAV are the same, and the substrate SB is the signal converter 132. In other words, the light is modulated by the multilayer filters 131 when the optical signals are received by the signal converter 132. In addition, a quantity of the multilayer films 131A included in the filter with a film structure 131 of each of the optical receivers can be adjusted. The thickness of the cavity film CAV can also be adjusted based on actual requirements.

In this embodiment, the filter with a film structure 131 is used as a band-pass filter to filter multiple bands of the light.

In addition, a quantity of peak signals of the band-pass filter is determined based on a quantity of the cavity films CAV included in the filter with a film structure 131.

Referring to FIG. 5 and FIG. 6, FIG. 5 and FIG. 6 are the transmission spectrum diagrams of the filter with a film structure in this embodiment. By adjusting the film thickness and the quantity of the cavity films CAV, there are eight different filter spectra, which show the different spectral responses modulated by eight light sensors of the optical receivers and the filters.

Figure 7:
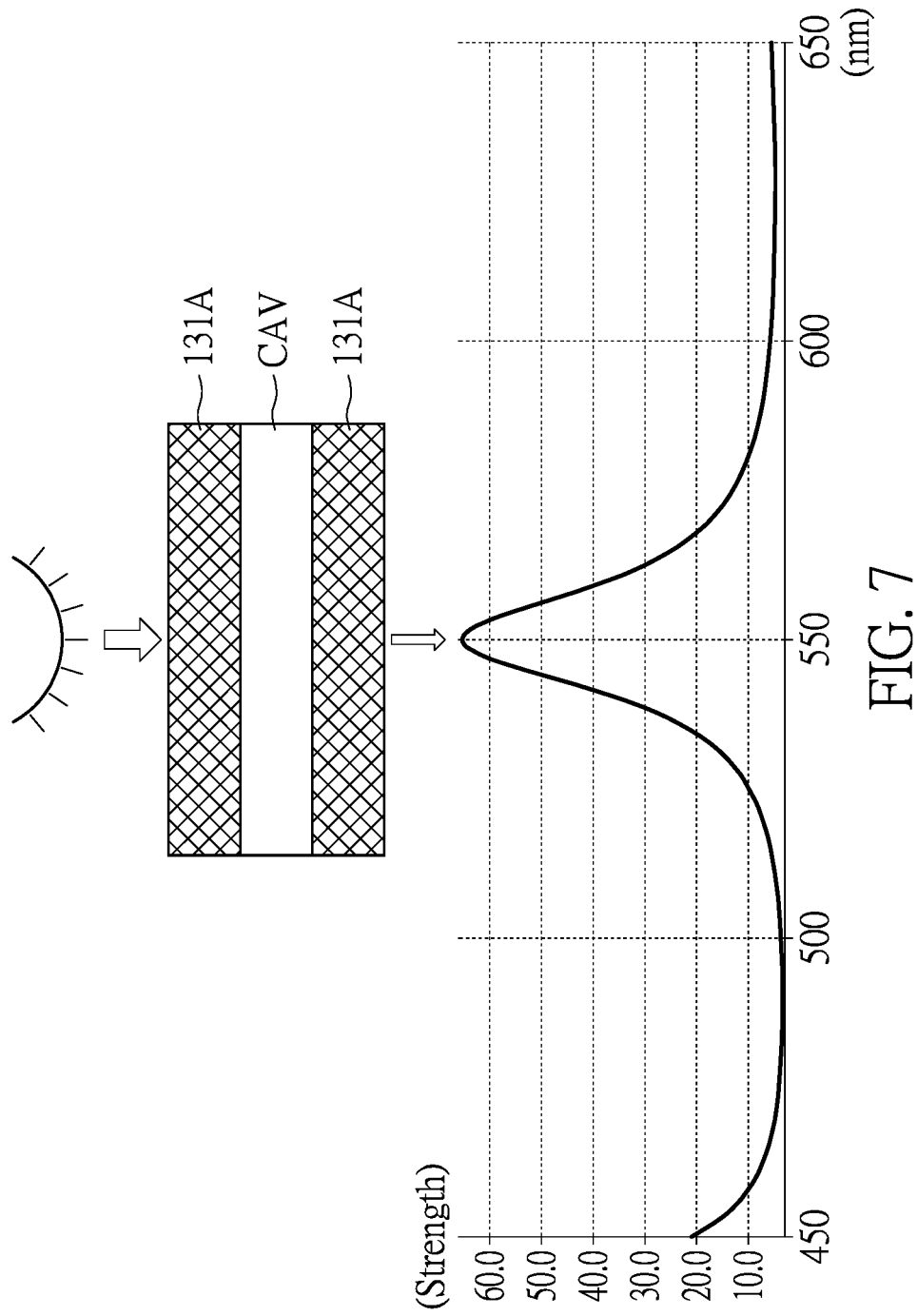
FIG. 7 is a spectrum diagram of a Single-cavity filter according to the present disclosure.

Referring to FIG. 7, when the light passes through the single cavity film CAV, a Single peak signal can be obtained, which is a bandpass-type signal and a transmission spectrum signal. The single cavity film is the cavity film CAV provided between the two multilayer films structure 131A that are used as two reflection mirror function in this embodiment of the present disclosure.

Figure 8:
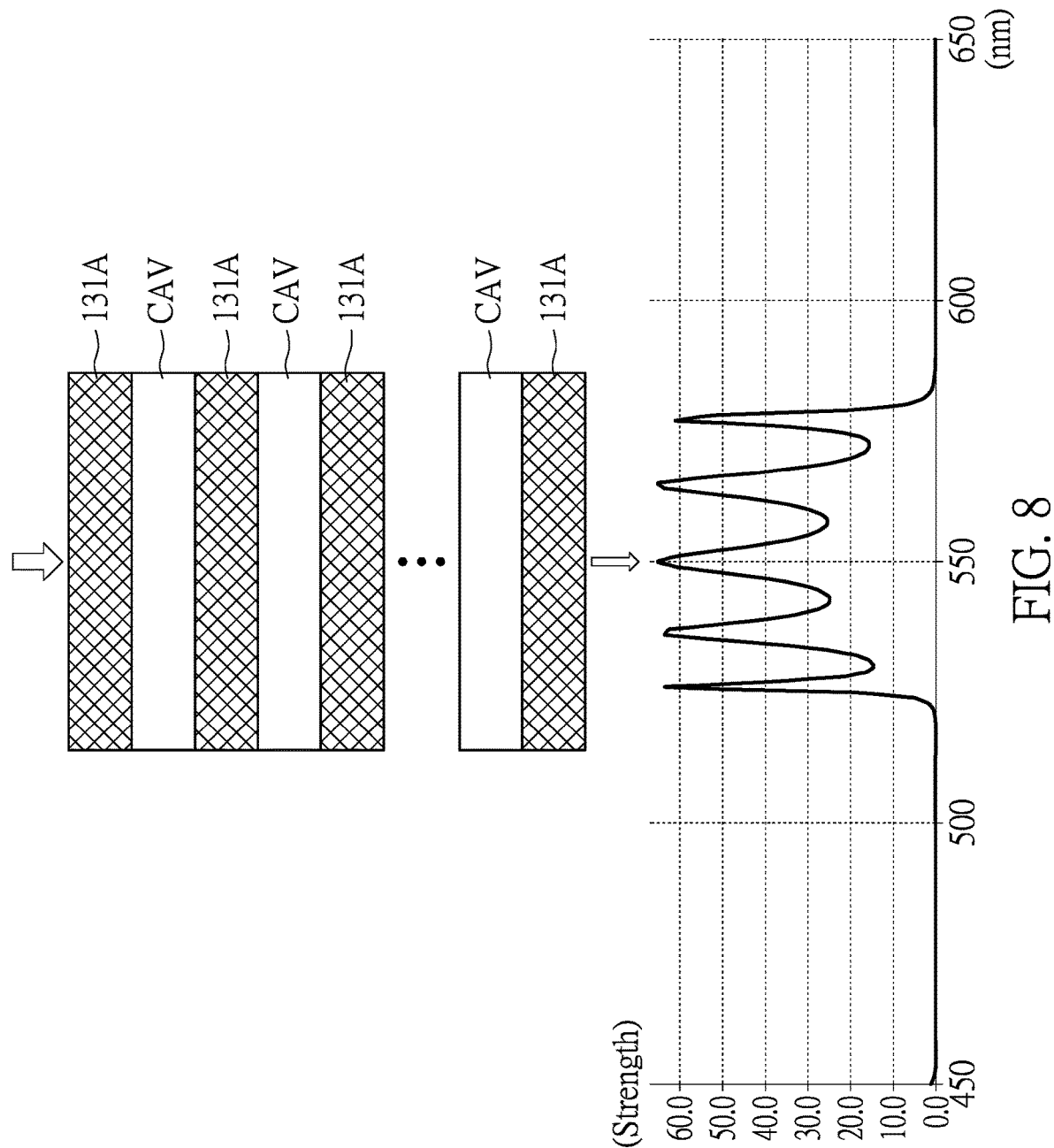
FIG. 8 is a spectrum diagram of the filter where a quantity of peak signals in a spectrum is determined based on a quantity of cavity films.

Referring to FIG. 8, FIG. 8 is a transmission spectrum diagram of the filter with a film structure including the plurality of multilayer films 131A and the plurality of cavity films CAV. There are five cavity films CAV in this filter, and thus five band-pass peak signals are obtained.

In each of the multilayer films 131A of this embodiment, multiple ones of the H-type structural film FH and multiple ones of the L-type structural film FL can be arranged in a laminated manner for formation of a mirror function design of the multilayer film 131A. In other embodiments, the multilayer film 131A can also be designed by a Single-layer metal reflective film.

Several multilayer film structures for mirror function can be laminated with the plurality of cavity films CAV to form the filter with a film structure 131.

Figure 9:
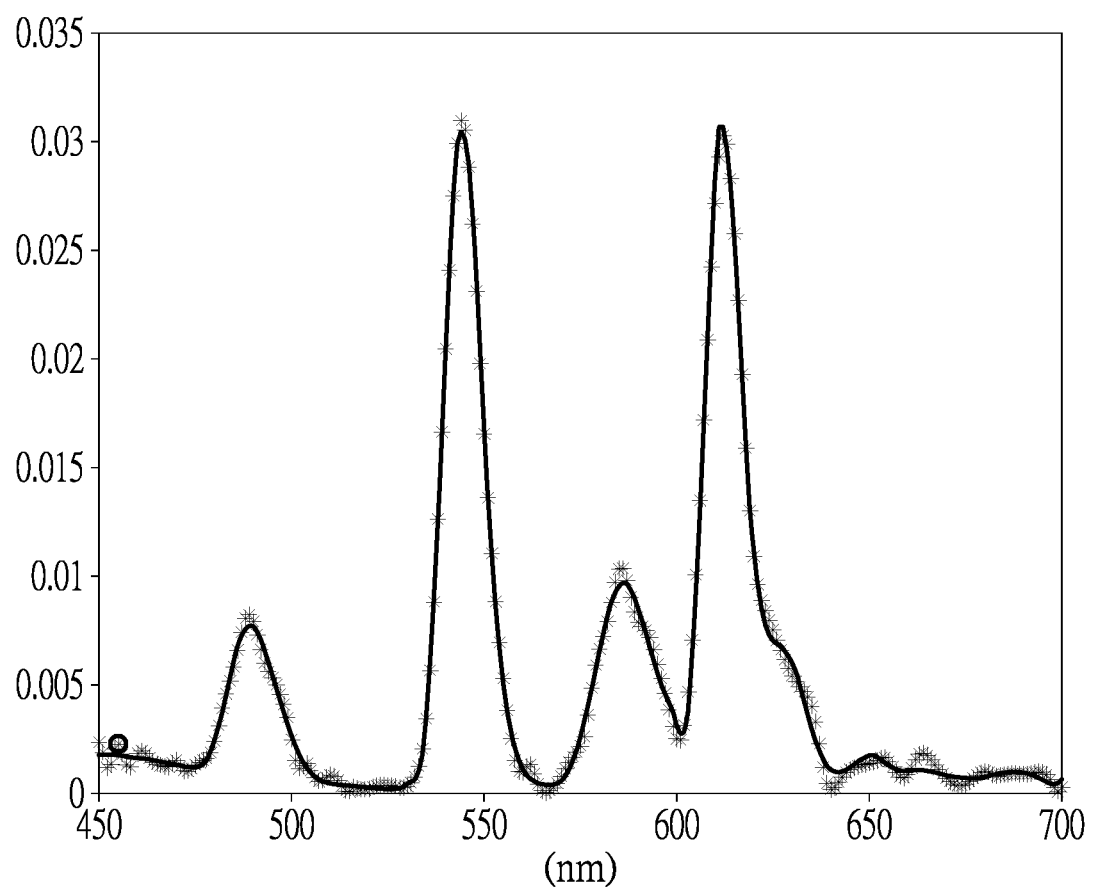
FIG. 9 is a spectrum reconstruction diagram showing effectiveness of measuring a spectral response of an object according to the present disclosure where a solid line indicates an initial spectrum of the object, and a dotted dashed line indicates a reconstructed spectrum of the object after receipt of signals through an optical receiver.

Referring to FIG. 9, FIG. 9 is a spectrum reconstruction diagram of the present disclosure, wherein the solid line is an initial spectrum of an object, and the dotted dashed line is a reconstructed spectrum of the objected through the light receiver, which verifies an effectiveness of the measurement of the object's spectral response in the present disclosure.

The solid line indicates a spectrum of the object, and the dotted dashed line indicates a spectrum diagram measured by the miniature spectrum measuring device in FIG. 1 of the present disclosure.

The controller 11 is a central processing unit (CPU), an application specific integrated circuit (ASIC), a graphic processing unit (GPU) or a microprocessor (MCU).

The storage module 14 is a flash memory, a read-only memory, a programmable read-only memory, an electronically rewritable read-only memory, an erasable and programmable read-only memory, or an electronically erasable and programmable read-only memory.

The communication module 15 includes a wired communication unit (not shown in the drawings) and a wireless communication unit (not shown in the drawings). The wired communication unit (not shown in the drawings) can be separately arranged, so as to be in communication connection with the server 9 and receive control signals or data in a database of the server 9. When the communication module 15 is a wireless communication unit, the communication module can be a Wi-Fi communication unit, a BLUETOOTH® communication unit, a Zigbee communication unit, a LoRa communication unit, an Sigfox communication unit, or a NB-IoT communication unit. The server 9 is a local server or a remote server.

BENEFICIAL EFFECTS OF THE EMBODIMENTS

In conclusion, the miniature spectrum measuring device provided by the present disclosure can use a specific light source provider and a limited number of optical receivers to receive reflected or transmitted light of the object to be measured. The received signal is modulated by the film structure disposed in front of the optical receivers to reconstruct the spectrum of the object. The miniature spectrum measuring device of the present disclosure can be used to detect the object to be measured or a specific light source, and can further improve detection speed and accuracy.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A miniature spectrum measuring device, comprising:
a controller;
a light source provider including at least one light source, wherein the light source provider is electrically connected to the controller, and the light source provider provides a plurality of lights with different spectra;
an optical receiver group including a plurality of thin film filters and a plurality of signal converters, wherein the plurality of signal converters are electrically connected to the controller, and each of the plurality of thin film filters is disposed on each of the signal converters, wherein the light source provider transmits the light to an object, the optical receiver group obtains a plurality of optical signals with different spectra based on the thin film filters that modulate the light transmitted or reflected from the object, and the optical receiver group provides the plurality of optical signals to the controller;

a communication module electrically connected to the controller, wherein the controller is in communication connection with a server through the communication module, the controller transmits the plurality of optical signals to the server, and the server or the controller generates a spectrum reconstruction information based on an analysis process and the plurality of optical signals;

wherein each of the plurality of thin film filters includes a plurality of multilayer films with a reflection function and a plurality of cavity films disposed among the plurality of multilayer films, so as to form a band-pass filter having a multi-peak transmission spectrum with a plurality of band-pass peak signals that are a series of multiple peaks, and the band-pass peak signals of different ones of the thin film filters are mutually staggered;

wherein the plurality of thin film filters are used to filter a plurality of bands of the lights according to the band-pass peak signals that are the series of multiple peaks.

2. The miniature spectrum measuring device according to claim 1, wherein each of the multilayer films at least includes a first film including $TiO_2$ and a second film including $SiO_2$, and the second film is disposed at a side of the first film.

3. The miniature spectrum measuring device according to claim 2, wherein the cavity film includes $TiO_2$ or $SiO_2$.

4. The miniature spectrum measuring device according to claim 2, further comprising a housing, wherein the light source provider and the optical receiver are disposed in the housing.

5. The miniature spectrum measuring device according to claim 1, wherein the analysis process includes a least square algorithm, a Tikhonov regularization algorithm, or a deep learning algorithm.

6. The miniature measuring device according to claim 1, wherein the at least one light source is a single wide-band light source with a set of spectrum modulation films, so as to modulate the single wide-band light source for generating the lights with different spectra.

7. The miniature spectrum measuring device according to claim 6, wherein the spectrum modulation films include a plurality of filtering films with different thicknesses, so as to modulate the at least one light source for generating the lights with different spectra.

8. The miniature spectrum measuring device according to claim 1, wherein the at least one light source included in the light source provider is plural in number, and each of the light sources generates the light with different spectra.

9. A miniature spectrum measuring device, comprising:

a controller;

a light source provider including at least one light source, wherein the light source provider is electrically connected to the controller, and the light source provider provides a plurality of lights with different spectra; and an optical receiver group including a plurality of thin film filters and a plurality of signal converters, wherein the plurality of signal converters are electrically connected to the controller, and each of the plurality of thin film filters is disposed on each of the signal converters, each of the thin film filters includes a plurality of multilayer films with a reflection function and a plurality of cavity films disposed among the plurality of multilayer films, so as to form a band-pass filter having a multi-peak transmission spectrum with a plurality of band-pass peak signals that are a series of multiple peaks, and the band-pass peak signals of different ones of the band-pass filter are mutually staggered, wherein the light source provider transmits the light to an object, the optical receiver obtains a plurality of optical signals with different spectra based on the thin film filters that modulate the light transmitted or reflected from the object, and the optical receiver group provides the plurality of optical signals to the controller;

a communication module electrically connected to the controller, wherein the controller is in communication connection with a server through the communication module, the controller transmits the plurality of optical signals to the server, and the server or the controller generates a spectrum reconstruction information based on an analysis process and the plurality of optical signals, wherein, when the light transmitted or reflected from the object is transmitted through the thin film filters, each of the cavity films generates a specific spectrum corresponding to the one of optical signals with different spectra, and the plurality of thin film filters are used to filter a plurality of bands of the lights according to the band-pass peak signals that are the series of multiple peaks.

10. The miniature measuring device according to claim 9, wherein the at least one light source is a single wide-band light source with a set of spectrum modulation films, so as to modulate the single wide-band light source for generating the lights with different spectra.

\* \* \* \* \*